Sept. 4, 1923.

C. A. MOUSSEAU

CROSS CHAIN FOR ANTISKID CHAINS

Filed Sept. 30, 1921

1,467,188

INVENTOR
Charles A. Mousseau

Patented Sept. 4, 1923.

1,467,188

UNITED STATES PATENT OFFICE.

CHARLES A. MOUSSEAU, OF PITTSBURGH, PENNSYLVANIA.

CROSS CHAIN FOR ANTISKID CHAINS.

Application filed September 30, 1921. Serial No. 504,317.

*To all whom it may concern:*

Be it known that I, CHARLES A. MOUSSEAU, a subject of the King of Great Britain, and resident of Pittsburgh, in the county of Allegheny and State of Pennsylvania, have invented a new and useful Improvement in Cross Chains for Antiskid Chains; and I do hereby declare the following to be a full, clear, and exact description thereof.

My invention relates to cross chains for the anti-skid chain devices commonly employed on vehicle wheels.

The object of my invention is to provide a cross chain in which the tread or wearing portion is composed of a minimum number of ordinary cross chain links attached to the side chains by means of a novel form of connection, whereby when one or more of the tread links is worn through it is only necessary to replace the few links at the center of the cross chain.

Another object of my invention is to provide a cross chain of the character indicated which may be quickly and conveniently attached to the side chains without the use of any special form of tools.

The ordinary form of anti-skid chains for vehicle wheels consists of two side chains which extend around the opposite sides of the wheel and are connected by means of cross chains extending over the tread of the wheel and permanently attached to the side chains. These cross chains are quickly worn through, and it is therefore necessary to make frequent replacements of the cross chains.

Various devices have been proposed for attaching the cross chains to the side chains in such a way as to permit the cross chains to be replaced without cutting any of the links. All of these prior devices, so far as I am aware, have involved the use of single connecting links at the ends of each cross chain, and practically the whole cross chain must be discarded when the cross chain wears through, only the end links being available for use in attaching the new cross chain.

I have found that all of the wear to which the cross chains are subjected is borne by the three or four links in the center of the chain. My present invention aims to make use of this fact and to produce a cross chain in which only these few central links are discarded when the chain wears through. At the same time, my complete cross chain is as flexible as an ordinary cross chain, the connections between the center or wearing links and the side chains being effected by means of auxiliary links of special construction which may be readily attached to each other and to the side chains, as well as to the intermediate links.

The accompanying drawing shows several forms in which my invention may be employed. Fig. 1 is a plan view of a complete cross chain showing the manner in which the several parts are connected together and to the side chains; Fig. 2 is a side view of the cross chain shown in Fig. 1; Fig. 3 is a view of one end of the chain of Figs. 1 and 2 showing the manner in which the end link is attached to the intermediate link; Fig. 4 is a view of the central links and one intermediate link, showing the manner in which the intermediate link is attached to the central links; Figs. 5, 6 and 7 are views of modified forms of intermediate links; and Fig. 8 is a plan view of a modified form of cross chain.

Referring first to Figs. 1 to 4, the cross chain therein shown consists of three central links 2 of ordinary construction, connected to side chains 3 by means of end links 4 and intermediate links 5. The central links 2 are preferably made of case-hardened steel, while the end links 4 and intermediate links 5 may be made of softer steel, brass or other desired metal, inasmuch as these end and intermediate links are not subjected to severe wear.

Each of the intermediate links 5 consists of a U-shaped loop portion 6, the two ends of which are reduced in diameter and bent back upon themselves to form elongated end loops 7. The metal composing these end loops is made thinner than the metal of the loop portion 6 in order to enable the end loops to be passed through the central chain links 2, as shown in Fig. 4, and at the same time to provide elongated openings 8 of sufficient size to admit the hooked ends 9 of the end links 4 in the manner shown in Fig. 3.

The end links 4 are similar to the intermediate links 5 in that they are of substantially U-shape and have loops formed at their ends. However, the end links differ from the intermediate links in that their sides converge, as shown in Fig. 1, and the end loops are made in the form of hooks 9, both of which are adapted to enter a single link of the side chains 3.

The intermediate links 5 are given a certain amount of twist similar to the twist of the central links 2, in order that they may form a continuation of the central links and may lie properly and flexibly upon the vehicle tire. The end links 4, however, need not have any twist of this kind.

In assembling the cross chain shown in Figs. 1 to 4, the intermediate links are first attached to the central links in the manner shown in Fig. 4, one of the side loops of each intermediate link being passed through the end link 2 and being then drawn straight, as shown in Figs. 1 and 2. The end links are then attached in the manner shown in Fig. 3, one of the hooks 9 of each of the end links being passed through the loop 8 of the intermediate link, and the end link being then brought into the straight position shown in Figs. 1 and 2. The hooks 9 of the end links 4 are then hooked into opposite links of the side chains 3, and the hooks 9 are hammered down to form closed loops.

As thus attached, the chain operates in all respects like an ordinary cross chain and is substantially as flexible as a cross chain composed entirely of ordinary links such as the links 2. When, however, one of the links 2 is worn through it is only necessary to detach the end and intermediate links by reversing the operations described above and then to reassemble the cross chain, using a new set of the links 2.

By reason of the detachable connections between the end links and the intermediate links, and between the intermediate links and the central set of links, the replacement of a broken cross chain involves only a replacement of the few central links, both the end links and the intermediate links being readily detached and reserved for attachment to a new set of central wearing links.

If desired, the loops 8 in the intermediate links 5 need not be long enough to admit the entire hook 9 of the end link 4, in which case the end link is attached to the intermediate link by passing one of its hooks 9 through both of the loops 7 of the intermediate link and twisting the end link to bring both of the loops 7 to the position shown in Figs. 1 and 2. In this form of my device the intermediate links are made sufficiently resilient to be compressed so that the hook 9 can be passed through both loops at the same time.

The intermediate links may be made in several different forms. In Figs. 1 to 4 the ends of the intermediate link which form the loops 7 are merely bent back upon themselves and beveled off to lie flat against the loop portion 5. In the form shown in Fig. 5 the intermediate link is constructed as in Figs. 1 to 4, except that the ends of the end loops are welded at 10 to the side portions of the link.

Figure 1:
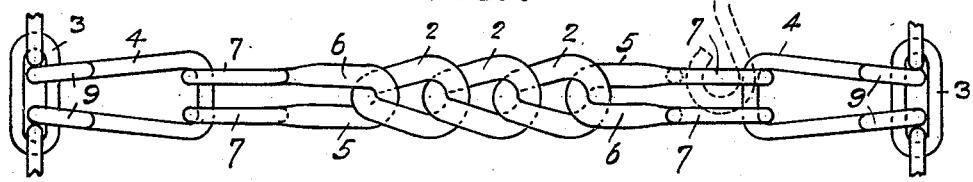
Figure 2:
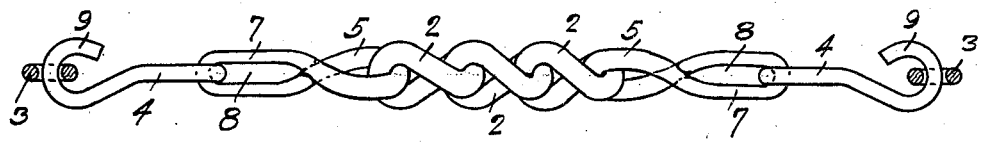
Figure 3:
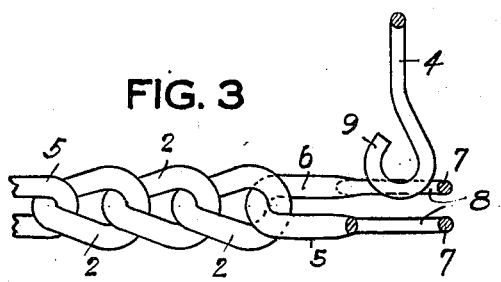
Figure 4:
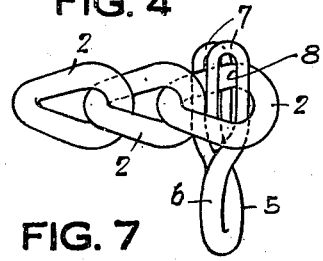
Figure 5:
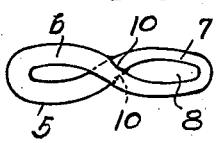
Figure 6:
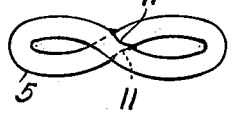
Fig. 6 shows another modification in which the intermediate link is made of material of uniform diameter, the ends of the loops being welded at 11 to the side portions of the link.
Figure 7:
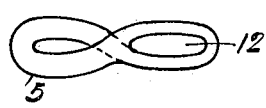
Fig. 7 shows another modification in which the two eyes 12 of the intermediate link 5 are forged out of a single piece of metal without joints.
Figure 8:
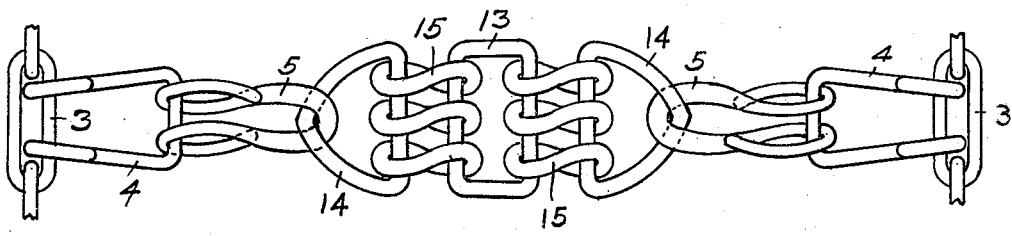

Fig. 8 shows a still further modification of my invention which makes use of end links 4 and intermediate links 5 similar to those described above. In this form of device, however, the central portion, instead of being an ordinary section of chain, as in Figs. 1 and 2, is composed of a flat rectangular central link 13, and two triangular links 14, which are connected to the central link 13 by means of several ordinary chain links 15 which may be similar to the central links 2 of Figs. 1 to 4. The central link 13 has no twist, but the triangular links 14 have sufficient twist to be connected properly with the intermediate links 5. This form of my device has the advantage that several of the links 5 which are subjected to wear may be broken without requiring the entire cross chain to be replaced.

I have shown and described the forms in which I now prefer to construct my invention, but it is to be understood that various changes in the details of my device may readily be made, and I therefore desire that no limitations be imposed upon my invention except such as are indicated in the appended claims.

I claim as my invention:

1. A cross chain for anti-skid devices comprising a straight section of permanently interconnected central wearing links, end links having loops for attachment to the side chains of an anti-skid device, and U-shaped intermediate links connecting the said central links and said end links, said end and intermediate links being manually detachable from each other and from said central links without cutting or distorting any of said links.

2. A cross chain for anti-skid devices comprising a straight section of permanently interconnected central wearing links, end links having loops for attachment to the side chains of the anti-skid device, and U-shaped intermediate links connecting the said central links and the said end links, and having end loops sufficiently large to receive said loops of said end links, the said end links being manually detachable from the said intermediate links without cutting or distorting either of said links, and the said intermediate links being similarly detachable from the said central links.

3. A cross chain for anti-skid devices comprising a straight section of permanently interconnected central wearing links, end links for attachment to the side chains of the anti-skid device, and manually detachable intermediate links connecting the said central and said end links, the said end links and the said intermediate links being composed of substantially U-shaped portions having loops formed in their ends, and being manually detachable from each other and from said central links without cutting or distorting any of said links, and the end loops of said intermediate links being sufficiently large to receive the end loops of said end links.

4. A cross chain for anti-skid devices comprising a plurality of central wearing links, end links for attachment to the side chains of the anti-skid device, and intermediate links connecting the said central links and said end links, said end and intermediate links being manually detachable from each other and from said central links without cutting or distorting any of said links, each of the said intermediate links being composed of a substantially U-shaped central portion, and loops formed at the ends of the said central portion, the material composing the said end loops being of smaller diameter than the material composing the said central portion.

5. A cross chain for anti-skid devices comprising a plurality of central wearing links, end links having looped ends for attachment to the side chains of the anti-skid device, and intermediate links connecting the said central links and said end links, said end and intermediate links being manually detachable from each other and from said central links without cutting or distorting any of said links, each of the said intermediate links being composed of a substantially U-shaped central portion, and loops formed at the ends of the said central portion, the material composing the said end loops being of smaller diameter than the material composing the said central portion, and the said end loops being of sufficient size to admit one of the looped ends of one of the said end links.

6. A cross chain for anti-skid devices comprising a tread device, end links for attachment to the side chains of the anti-skid device, and intermediate links connecting the said tread device with the said end links, the said tread device comprising a central link, two triangular links spaced from the said central link and connected to the said intermediate links, and a plurality of chain links connecting the said central link with each of the said triangular links.

7. A cross-chain for anti-skid devices comprising a plurality of central wearing links, end links for attachment to the side-chains of the anti-skid device, and intermediate links connecting said central links to said end links, the said intermediate links having end loops engaging said end links, and said end loops being spaced apart sufficiently to enable said intermediate links to be detached, without bending, from said central links.

8. A cross chain for anti-skid devices comprising a plurality of central wearing links, end links for attachment to the side chains of the anti-skid device and having widened central loops, and intermediate links connecting said central links to said end links, the said intermediate links having end loops engaging said widened central loops of said end links, and said end loops being spaced apart sufficiently to enable said intermediate links to be detached, without bending, from said central links.

In testimony whereof, I, the said CHARLES A. MOUSSEAU, have hereunto set my hand.

CHARLES A. MOUSSEAU.

Witnesses:
JOHN F. WILL,
EDITH K. FREESE.